United States Patent [19]

O'Brien

[11] Patent Number: 4,683,618

[45] Date of Patent: Aug. 4, 1987

[54] REDUCTION OF BACTERIA COUNT ON POULTRY BEING PROCESSED INTO FOOD AT A POULTRY PROCESSING PLANT

[76] Inventor: Gerard T. O'Brien, 2162 Skyline Dr., Gainesville, Ga. 30501

[21] Appl. No.: 893,366

[22] Filed: Jul. 28, 1986

[51] Int. Cl.$^4$ .............................................. A22C 21/00
[52] U.S. Cl. ......................................... 17/51; 17/11; 17/65
[58] Field of Search ................................ 17/51, 11, 65

[56] References Cited

U.S. PATENT DOCUMENTS 3,522,058 7/1970 Libby .................................. 17/51 X
4,185,359 1/1980 Niccols .................................... 17/51

FOREIGN PATENT DOCUMENTS 2518873 7/1983 France ..................................... 17/51
706047 12/1979 U.S.S.R. ................................... 17/51

Primary Examiner—Willie G. Abercrombie

[57] ABSTRACT

Bacteria and foreign matter can be more thoroughly removed from poultry carcases being processed for food by deluging with water, then spraying with an atomized high velocity solution of baking soda and water, deluging with water again. Then spraying with an atomized high velocity solution of baking soda and wa-water for the second time, then spraying with an atomized mist of 3% hydrogen peroxide, and finally deluged again with ordinary plant tap water.

1 Claim, No Drawings

REDUCTION OF BACTERIA COUNT ON POULTRY BEING PROCESSED INTO FOOD AT A POULTRY PROCESSING PLANT

DESCRIPTION OF SYSTEM AND OPERATION

Background

USDA inspectors sample the processed poultry and check in the lab for bacteria. The bacteria is assumed to come from the bird's intestines which ocassionally burst when they are being removed. The material emerging from the burst intestines then drips down onto the outsides of the birds passing on the assembly or process conveyor line; and this causes bacterial contamination which is not completely removed with water washing later in the process. (chlorinated water is presently used).

A recent preliminary agriculture department study indicates that poultry fed milo, or grain sorghum, are much more likely to be contaminated during processing than are corn-fed birds. The USDA study is supposed to have indicated that milo-fed birds had bacterial contamination levels four to five times higher than corn-fed birds. It is believed that milo may stick to processed birds more than corn feed residues.

PROPOSED SOLUTION

After a bird has been eviscerated and the feathers have been removed it is sprayed with water. Then a few feet further along in the process line it is sprayed with a high velocity atomized spray of a mixture of water and pure baking soda (ie. sodium bicarbonate). Sodium bicarbonate—$NaHCO_3$, is already used as an ingredient of baking powder, effervescent salts and beverages. It is also used medicinally for people for gastric or urinary hyperacidity, and locally as an aq. cleansing solution (1 to 4%) for mucous membranes and as a saturated solution for dressing minor burns. Sodium bicarbonate is also used in the veterinary field of medicine both externally and internally on animals. (reference: The Merck Index; 7th ED)

Spraying the bird with this mixture (or solution) of water and baking soda will help to "soap up" the skin of the bird being processed, and will break down dirt and matter from the burst intestines and cause this residue to become "slippery."

Five (5) seconds after being sprayed with the baking soda-water solution, the bird should be deluged with plain water and then a few feet later hit with a second burst of baking soda and water solution atomized spray. A few feet further on the bird should be hit with an atomized spray of hydrogen peroxide. This would be a 3 percent solution of hydrogen peroxide (3% $H_2O_2$ U.S.P.). The active ingredients of this solution are—hydrogen peroxide 3%—and inert ingredients 97%. This type of solution of hydrogen peroxide is presently sold across the counter for topical use as an antiseptic "to help prevent infection in minor cuts, burns, and abrasions". It is also sold to people for use in rinseing out the mouth and for gargling. It should be kept away from the eyes.

The Merck Index, 7th Edition, indicates that hydrogen peroxide is used:

"In pharmaceutical preparations, mouthwashes, dentifrices, and sanitary lotions."

"Topical antiseptic, has also been used internally in gastritis."

"Vet. use: antiseptic for cleansing wounds and irrigation of mucous membranes. Has been recommended as a general anthelmintic for rectal administration in dogs and as an irrigant for trichomoniasis in bulls."

It should be noted that the 3% $H_2O_2$ can be prepared from "hydrogen peroxide solution 30%—Superoxol". This peroxide solution is now replacing the 3% solution for industrial uses being diluted to the required strength (3%) immediately before use. However the 30% solution should be treated with great care since it is a very strong oxidant and is dangerous.

Once the bird being processed has been hit from all sides with the atomized spray of 3% $H_2O_2$ it should be moved on down the process line for about 5 seconds in this condition and then deluged with the usual plant cleaning water.

It can readily been seen that the processed bird, soaped up with the baking soda-water solution (twice), and smothered in a spray of 3% hydrogen peroxide solution, and then washed off with a deluge of plant cleaning water, should be in a tremendously clean and antiseptic condition. Bacteria count should be lower than the lowest ever recorded in a U.S.A. poultry processing plant.

One of the toughest types of bacteria to "kill off" is the one that causes periodontal disease (gum disorder) of the mouth in humans. It is believed that a solution of: 3% $H_2O_2$ and baking soda, has helped conqueor and control this disease in some people, when they brushed and rinsed with this mixture (their teeth and gums) twice a day. If this approach works on periodontal disease it should do even better on reducing bacteria on processed poultry.

CONCLUSION

Using this approach should prove to be economically beneficial to the poultry industry and especially to the processors. Fewer birds should reach the end of the line with objectionable bacteria count. So, fewer birds should be rejected by the USDA inspectors.

Milo (grain sorghum) fed birds should also do well since the baking soda solutions should overcome the sticky characteristics of this feed residue and "milo specs" should no longer cling to the skin of the processed birds. Thus the lower cost milo grain can continue to be used to feed broilers for human consumption.

Safety

Even though baking soda and 3% hydrogen peroxide are presently used by humans, both externally and internally, good sense should be used when utilizing them in poultry processing plants. For example, the atomized spray of both should be drawn or vented to the outside of the plant immediately after spraying on the poultry being processed.

The hydrogen peroxide is additionally safe on the processed birds because it breaks down into water and oxygen harmlessly shortly after it is exposed to air and light.

Baking soda is also used in small quantities in cake and bread baking ingredients.

Equipment

It is thought that equipment already exists on the open market which can readily be adapted to mixing the solutions, spraying them on the birds and venting the residual spray mists. The process line would require very little changes to be made except for the addition of the mixing tanks, the spray misters and the venting.

It is believed that some periodontist's offices are already equipped with baking soda plus water sprayers which they use to spray patients teeth and gums to remove plaque, etc.

| Economics of Use - and Assumptions. | |
|---|---|
| Baking Soda | 1 lb gives 6 gallons of mixture for 16¢. (Say) each bird uses ¼ pint in atomized spray. ∴ 16¢ gives 6 gall × 8 pts × 8 birds = 400 birds This is done twice So 16 × 2 = 32¢; say 40¢ = 400 birds. 1 bird costs 40/400¢. |
| Hydrogen Peroxide | 70¢ per pint retail (3% $H_2O_2$) 10¢ per pint in 30% $H_2O_2$ bulk 3% $H_2O_2$ = 1 pint does 8 birds atomized spray for 10¢. 1 bird costs 10/8 = 1¢ per bird |
| Total Cost of 1000 Birds Cost @ 4 lb per bird 4000 lb cost $11.00 1,000 lb cost 11/4 = $3.00 Is equvalent to 4 birds per 1000, at *Breakeven economics The reader is urged to make his own cost calculation. | soda + 3% $H_2O_2$ spraying 1 bird cost = 1/10¢ + 1¢ = 1.1¢. 1.1 × 1000 ÷ 100 = $11.00 |

*If more than 4 birds per 1000 are rejected for milo or bacteria then the system would be economically viable.

I claim:

1. A method of removing bacteria and foreign matter from poultry carcasses being processed for food comprising the steps of deluging the carcasses with water, then spraying said carcasses with an atomized high velocity solution of baking soda and water, deluging said carcasses with water again, then spraying said carcasses with an atomized high velocity solution of baking soda and water for the second time, then spraying said carcasses with an atomized mist of 3% hydrogen peroxide, and finally deluged said carcasses again with ordinary plant tap water.

* * * * *